No. 748,582. Patented January 5, 1904.

UNITED STATES PATENT OFFICE.

JOHN HARLOW CHAPMAN, OF CEDAR RAPIDS, IOWA.

FILLER FOR COB PIPES.

SPECIFICATION forming part of Letters Patent No. 748,582, dated January 5, 1904.

Application filed April 14, 1903. Serial No. 152,524. (No specimens.)

*To all whom it may concern:*

Be it known that I, JOHN HARLOW CHAPMAN, a citizen of the United States, residing at Cedar Rapids, in the county of Linn and State of Iowa, have invented certain new and useful Improvements in Fillers for Cob Pipes, of which the following is a specification.

This invention relates to the manufacture of cob pipes, and has for its object to produce a coating or filler for the rough surface of the pipe to render it smooth and attractive in appearance, which shall be convenient to use, with or without coloring-matter, and when applied to a pipe produces a finished and handsome surface, hardened without the application of heat.

The nature of the invention will fully appear in the description following.

Before describing my improved composition it may be said that a good and convenient filler for cob pipes has been much sought for in the manufacture of cob pipes. A simple plaster-of-paris solution has been used; but it is open to the serious objection that it soon sets and becomes unworkable. The plan now generally adopted is to wet the pipe liberally and apply the plaster-of-paris in the form of a dry powder, working it into the pores of the pipe by hand. This, too, is troublesome and at best does not produce so satisfactory a filler nor so good a surface as does the composition I will now describe.

To a thin saccharine solution add chalk or some of its derivatives—whiting or the like—in sufficient quantity to produce a doughy mass. This is applied to the pipe in the usual way, being rubbed into the pores of the pipe by hand. Considerable latitude is allowed in the proportions of the ingredients. In making the saccharine solution glucose and water are preferred and are mixed to about the consistency of milk. Enough of the chalky substance is then added to make a compound which will not run at the one extreme or crumble if too thick. To this may be added coloring-matter to suit the taste. In practice I have produced handsome effects by the use of simple anilin dyes, commonly known as "Diamond dyes," and which are in almost universal use.

The compound mixed as above described keeps its plasticity all day, and is therefore very convenient to work. Hardening somewhat over night, it may be softened for the next day's use by the addition of a little water; but as applied to a pipe the small quantity thereon dries over night or in a few hours, leaving a smooth unbroken surface to take a finishing-varnish.

There being nothing of an unwholesome or disagreeable nature in the compound, it may be applied to the inside as well as the outside of the pipe, if desired.

Having thus described my invention, what I claim as new, and desire to secure by Letters Patent, is—

1. A cob-pipe filler composed of a thin saccharine solution and a body of whiting, or other chalky material, mixed to a doughy mass.

2. A cob-pipe filler composed of glucose, water and whiting mixed substantially as described.

3. A cob-pipe filler composed of a saccharine solution, whiting, or the like chalky substance, and coloring-matter, substantially as described.

In testimony whereof I affix my signature in presence of two witnesses.

JOHN HARLOW CHAPMAN.

Witnesses:
CLIFFORD L. HILES,
J. M. ST. JOHN.